United States Patent [19]
Picco et al.

[11] Patent Number: 6,029,045
[45] Date of Patent: Feb. 22, 2000

[54] SYSTEM AND METHOD FOR INSERTING LOCAL CONTENT INTO PROGRAMMING CONTENT

[75] Inventors: Martin R. Picco, Santa Cruz; William G. Mears, Scotts Valley; Jonathan S. Kau, San Leandro, all of Calif.

[73] Assignee: Cogent Technology, Inc., Santa Cruz, Calif.

[21] Appl. No.: 08/987,337

[22] Filed: Dec. 9, 1997

[51] Int. Cl.[7] .............................. H04H 1/00; H04N 7/14
[52] U.S. Cl. ................................. 455/5.1; 348/1; 348/9; 348/12; 455/2
[58] Field of Search .................... 709/217–219; 455/2, 3.1, 3.2, 4.1, 4.2, 5.1, 6.1, 6.2, 6.3; 348/1, 2, 6, 9, 10, 12, 13

[56] References Cited

U.S. PATENT DOCUMENTS

| | | | |
|---|---|---|---|
| 5,600,364 | 2/1997 | Hendricks et al. | 348/3 |
| 5,761,601 | 6/1998 | Nemirofsky et al. | 348/6 |
| 5,774,170 | 6/1998 | Hite et al. | 348/9 |
| 5,805,974 | 9/1998 | Hite et al. | 348/9 |

*Primary Examiner*—John W. Miller
*Attorney, Agent, or Firm*—Gray Cary Ware & Freidenrich LLP

[57] ABSTRACT

A system for communicating a programming data stream and a data stream containing pieces of local content data that are going to be inserted into a local content space in the programming data stream at some predetermined time is provided in which the programming data stream and the local content digital data stream are transmitted to a set-top box in a house of a user, the set-top box stores a predetermined portion of the pieces of local content data based on predetermined criteria, and the set-top box identifies a local content space in the programming data stream. The set-top box may also select a particular piece of local content from the storing system to insert into the local content space in the programming data stream based on a plurality of predetermined preferences of the user, retrieve that selected piece of local content from said storage means, and insert that selected piece of local content into said programming data stream at said local content space so that individualized local content specific to the user of the set-top box is inserted into the programming data stream.

52 Claims, 9 Drawing Sheets

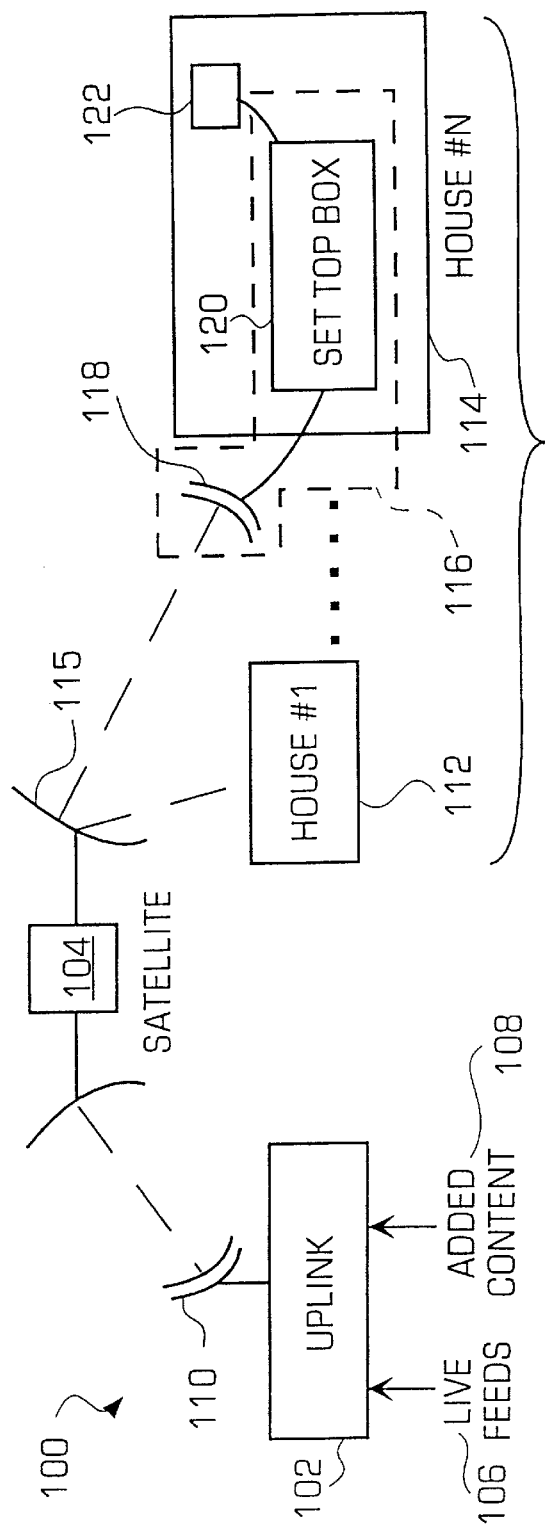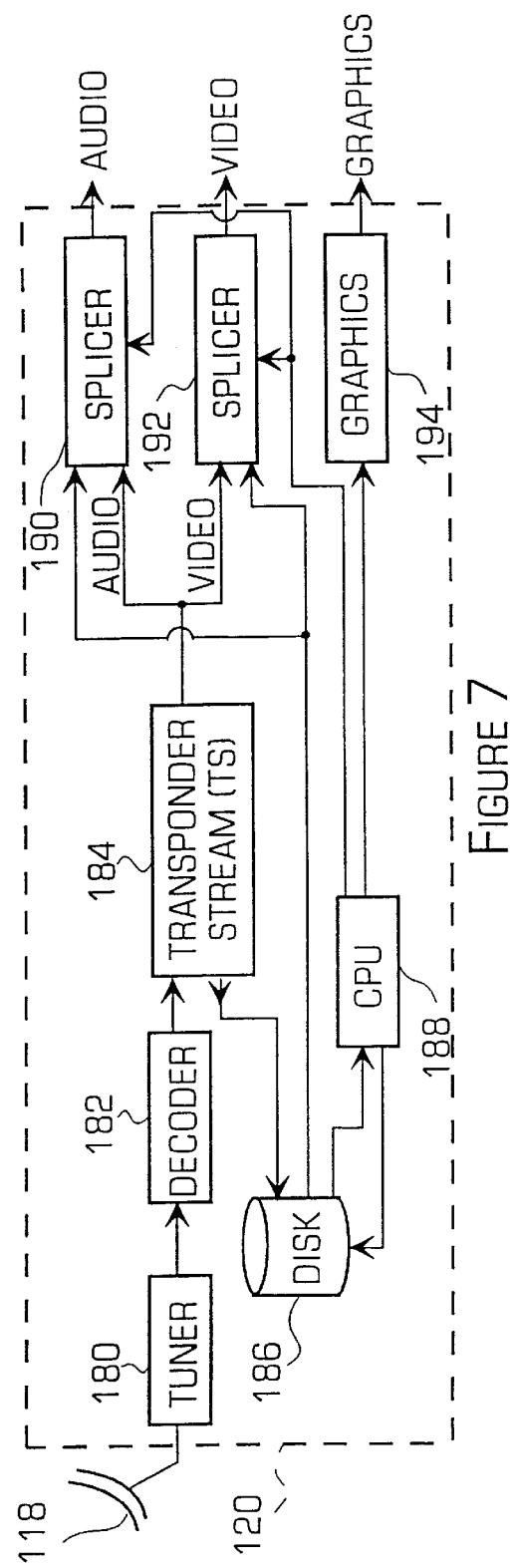

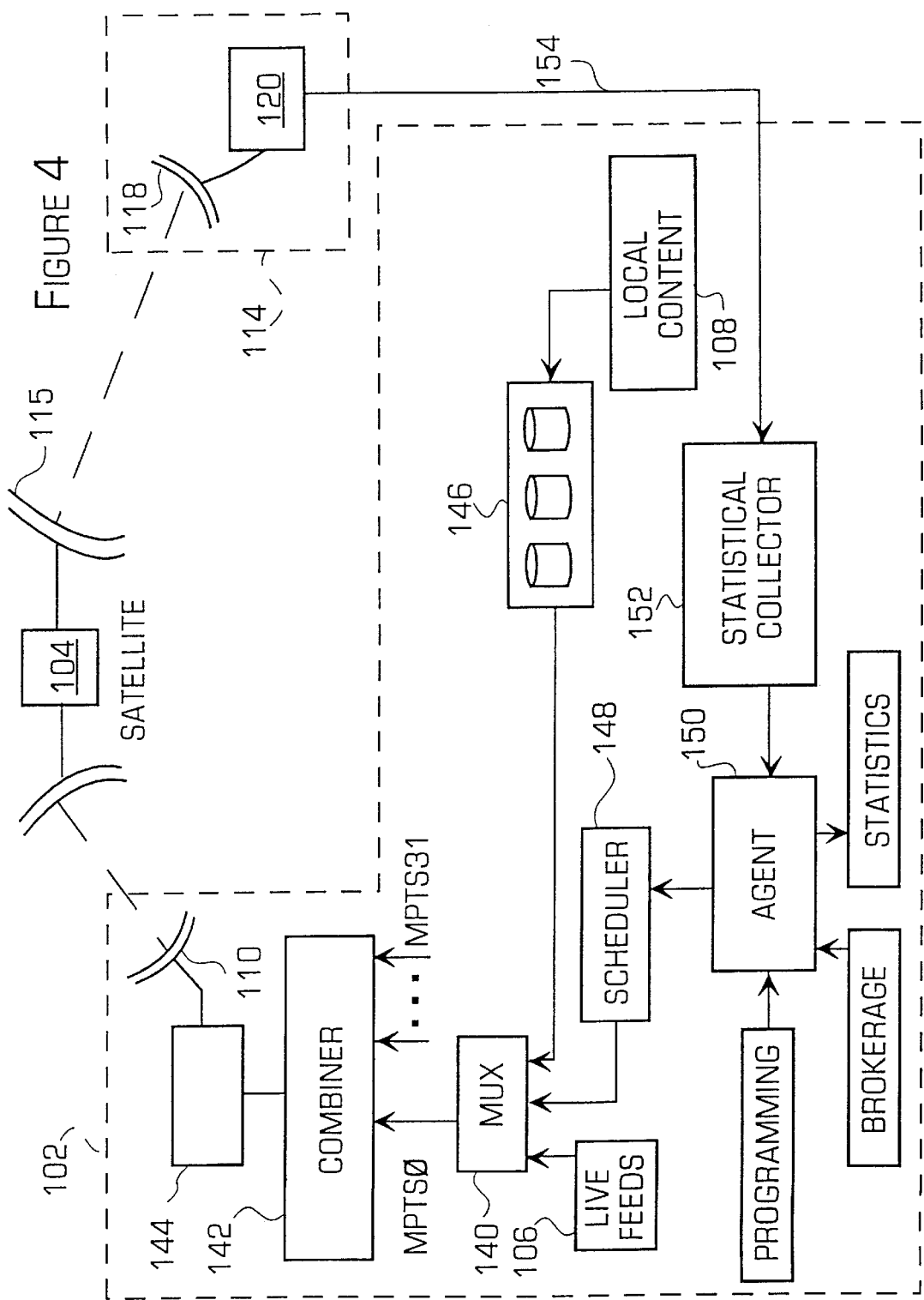

SYSTEM AND METHOD FOR INSERTING LOCAL CONTENT INTO PROGRAMMING CONTENT

BACKGROUND OF THE INVENTION

This invention relates generally to a system and method for inserting individualized data content into a compressed digital data stream and in particular to a system and method for inserting individualized data content into a compressed digital video and audio data stream being transmitted to a plurality of viewers by any type of broadcast system, such as a satellite-based, cable-based, wireless cable (i.e., microwave) or terrestrial broadcast system.

Prior to the introduction of cable television and the like, a television receiver received its television signals from the antenna connected to the television. However, for someone in a remote location or where television signals are blocked, such as a high rise apartment, the reception of the antenna was so poor that the person was unable to watch television at all. To solve such problems, television signals may be transmitted over cables or satellite-based systems that permit the user to view any television program available on the cable or satellite without an antenna. The cable system typically transmits local television stations to the user while a satellite system transmits the same television signals to all of its user across the entire country so that a television viewer in California may watch a New York television station. These conventional cable and satellite systems generate and transmit analog television signals that are received by a set-top box in the home of the television viewer and then displayed on the television screen. With these systems, the operator of the local cable system may easily insert local advertisements and data content into the analog data stream. The local advertisements and data content, however, that are added into the data stream are the same for every subscriber to that cable system.

In addition, with conventional television transmissions systems, television broadcasters are limited by the channel capacity between their last stage transmission facility (e.g., satellite, cable head-end or broadcast station) and their viewers. Thus, on any given channel, viewers served by that transmission facility receive the same programming data at the same time. From an advertising perspective, this means that every viewer watching that channel views the same commercials. This prevents satellite operators, for example, from being able to offer localized advertising because their satellite broadcasts to the entire country at once. Cable operators, however, are able to offer localized commercials within their subscriber area since their head-end facilities are geographically distributed. Neither the satellite operator nor the cable operator, however, can provide targeted commercials that are directed to a particular user or provide the ability to factor viewer preferences into determining what local content is being shown to a viewer.

It is desirable to deliver television programming to consumers in a more targeted manner than is possible with existing cable or satellite systems. In particular, it is desirable to be able to, for example, deliver geographically localized content to a particular area over a non-geographically localized transmission medium, such as a satellite system. Some conventional systems use the Internet or data casting to deliver individualized content to a viewer, but these systems do not permit a satellite system to transmit localized content or permit the operator of the satellite system to control the local content.

Some conventional cable and satellite-based television systems and most future systems are going to be transmitting their television signals in a digital compressed data format in order to make more efficient use of the bandwidth of the cable or the satellite system. The data is typically compressed using the Motion Pictures Experts Group (MPEG) format due to the high compression rates which reduce the bandwidth required to transmit the data. Although this compressed digital data stream is more compact, it is more difficult to insert local content within these compressed digital data streams. By contrast, a conventional still image compression scheme, such as Joint Photographic Experts Group (JPEG), may have data more easily inserted within the data stream since there is not any motion compensation required. These still image compression schemes, however, do not provide sufficient compression for video data streams. Thus, a motion compensation based compression scheme, such as MPEG, is used which involves using predictive methods to reduce the temporal redundancies (i.e., portions of the screen that may have the same image for a predetermined period of time) inherent in typical video data streams. Thus, MPEG has a higher level of compression due to these predictive methods, but also creates temporal dependencies (i.e., a frame of the data stream requires data from some other frame in order to actually recreate the image in the frame) in the compressed data. Thus, in order to insert data within a compressed data stream, these temporal dependencies must be recognized and some technique for solving the problems associated with these temporal dependencies is needed.

Thus, it is more difficult to insert data into a compressed digital data stream. In addition, as described above, there is no conventional system which permits local targeted content, that is inserted into a compressed digital data stream or an analog data stream, to be customized for a particular user of the system. As described above, one conventional cable system permits an operator of the system to insert local content into an analog data stream, but that local content is the same for all of the users that subscribe to that operator's system. Therefore, it is desirable to provide a compressed digital data stream of video into which local content may be inserted and to provide a system that may customize the local content displayed on each user's television based on some predetermined preferences of the user.

Thus, there is a need for a system and method for providing individualized local content in digital or analog data streams which avoid these and other problems of known systems and methods, and it is to this end that the present invention is directed.

SUMMARY OF THE INVENTION

The invention provides a broadcaster with a system to provide targeted content to its users wherein the content is under the control of the broadcaster and the viewer is unaware of the targeted content. This permits a broadcaster to deliver geographically localized content (e.g., commercials targeted for a particular area of the country) over a national transmission medium, such as a satellite. The system may also permit a user to specify preferences for the local content that the user will receive and then deliver local content that best satisfies those preferences.

The invention permits a broadcaster to segment its viewers for advertisers so advertisers may target their commercials at a particular portion of the broadcaster's audience. Thus, the broadcaster can segment their viewers and the advertisers benefit since they are able to more effectively reach viewers who are more likely to be interested in their product often at a lower total cost since the advertiser does not have to purchase the rights to advertise in the entire market.

The invention may include a set-top box at a household that is capable of storing data and inserting that stored data into live data streams, and equipment at the data transmission facility that assembles and delivers local content to be inserted into the live data streams at a later time and transmits individualized instructions to each set-top box about what local content should be stored and when each piece of local content should be inserted into the live data stream. The data streams may be either digital or analog data streams. The invention may also include an agent server that permits viewers to specify preferences about what content they would like to see so the inserted content may be customized for each viewer.

The invention provides a system and method for providing individualized local content in a digital data stream in which a plurality of pieces of local content may be downloaded to a set-top box, but only a selected portion of these pieces of local content are stored in a hard disk in the set-top box. The local content may be downloaded to the set-top box using several different techniques that includes slowly trickling the local content data to the set-top box, downloading the local content over the channels at some predetermine time when the set-top box is probably not in use (i.e., 3 AM) or downloading the local content over a separate channel. Once the selected pieces of local content are stored on the disk of the set-top box, the pieces of local content may be inserted into the programming data. The storing and insertion of local content into the programming data for a viewer may be customized based on the preferences of a viewer.

The system also provides a method for gathering data about the preferences of a user so that the type of local content stored on the set-top box may be customized to the user so that the user views only certain local content. The system also provides a method for simultaneously viewing a television station while browsing the word wide web in which the programming data during the web browsing may be stored on the disk of the set-top box.

Then, when the user has finished browsing the web, the programming data stored on the disk may be played back to the user so that the user does not miss any programming data while browsing the web.

In accordance with the invention, a system for communicating a programming data stream and a data stream containing pieces of local content data that are going to be inserted into a local content space in the programming data stream at some predetermined time is provided in which the programming data stream and the local content digital data stream are transmitted to a set-top box in a house of a user, the set-top box stores a predetermined portion of the pieces of local content data based on predetermined criteria, and the set-top box identifies a local content space in the programming data stream. The set-top box may also select a particular piece of local content from the storing system to insert into the local content space in the programming data stream based on a plurality of predetermined preferences of the user, retrieve that selected piece of local content from said storage means, and insert that selected piece of local content into said programming data stream at said local content space so that individualized local content specific to the user of the set-top box is inserted into the programming data stream.

In accordance with another aspect of the invention, an apparatus for displaying images from a programming data stream and a data stream containing pieces of local content data that are going to be inserted into a local content space in the programming data stream at some predetermined time is provided where the programming data stream and the pieces of local content data are received and a predetermined portion of the received pieces of the local content data are stored based a predetermined criteria. A local content space in the programming data stream is then identified, a particular piece of local content to insert into the local content space in the programming data stream is selected based on a plurality of predetermined preferences of a user, the selected piece of local content is retrieved, and the selected piece of local content is inserted into said programming data stream at said local content space so that individualized local content is inserted into the programming data stream.

BRIEF DESCRIPTION OF THE DRAWINGS

FIG. 3 is a block diagram illustrating a satellite-based television system in accordance with the invention;

FIG. 4 is a block diagram illustrating a head-end assembly of the satellite-based television system in accordance with the invention;

FIG. 7 is block diagram illustrating details of a first embodiment of the set-top box of the satellite-based television system in accordance with the invention;

DETAILED DESCRIPTION OF A PREFERRED EMBODIMENT

The invention is particularly applicable to a system and method for providing local content in compressed digital data streams generated by a satellite-based television system. It is in this context that the invention will be described. It will be appreciated, however, that the system and method in accordance with the invention has greater utility. For example, the system and method in accordance with the invention may also be used in connection with a cable-based compressed digital data stream television system, with any other transmission system that transmits compressed digital data to a user in which other digital data may be inserted within the compressed digital data or with an analog data broadcast system. Now, to better understand the invention, a conventional satellite-based television broadcast system will be described.

Figure 1:
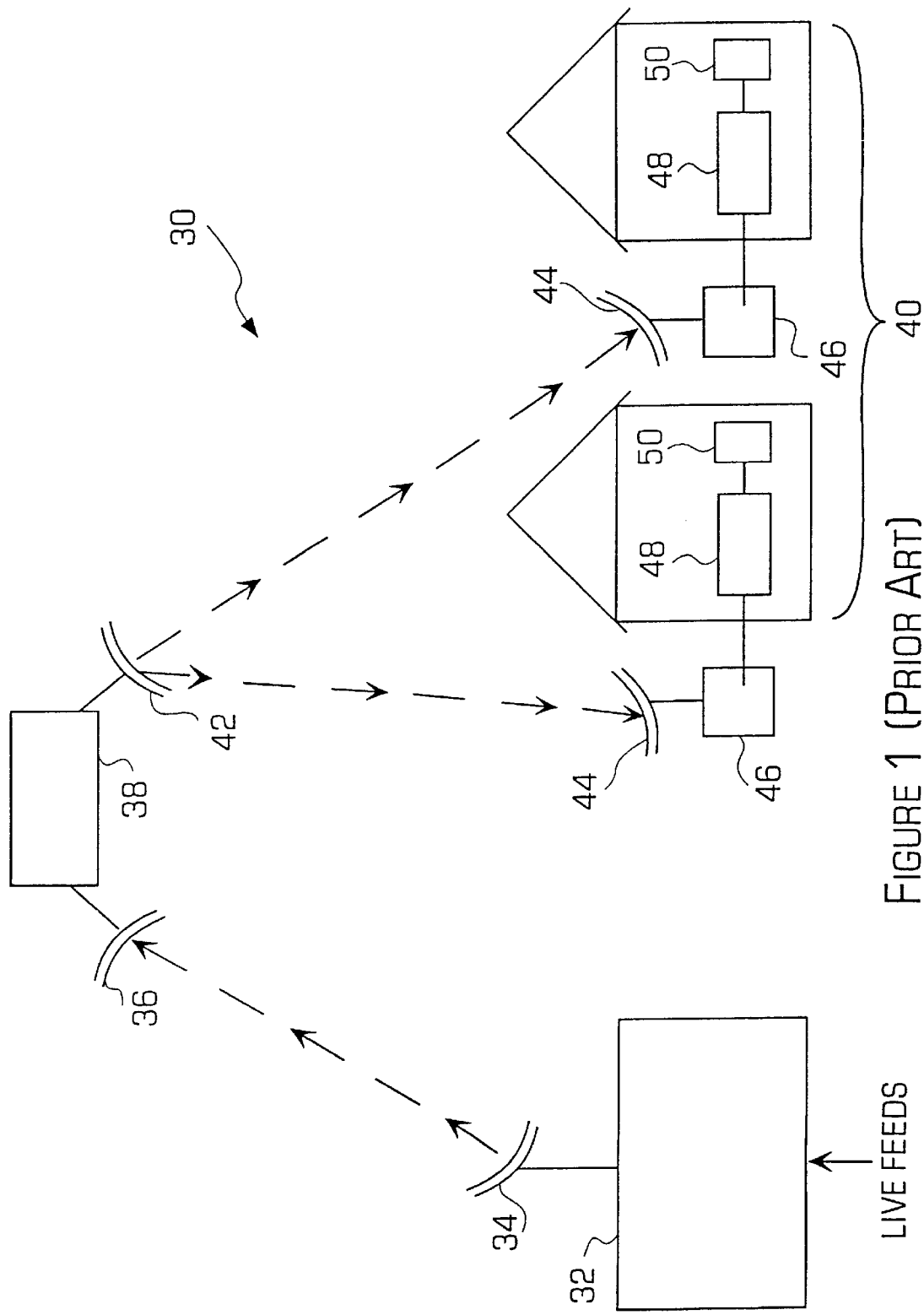
FIG. 1 is a block diagram illustrating a conventional satellite-based television system.

FIG. 1 is a block diagram illustrating a conventional satellite-based television broadcast system 30 that includes a satellite head-end station 32 that includes an uplink antenna 34. The head-end station receives live television feeds (i.e., analog data streams) from various sources and combines those analog data streams into a single multiplexed analog signal. The single multiplexed analog signal is then transmitted by the uplink antenna 34 to a receiving antenna 36 of a satellite 38 orbiting above the earth. The multiplexed signal received by the satellite is then transmitted back to a plurality of households 40 by a downlink antenna 42. The signal transmitted from the satellite is received at each household, through a receiving antenna 44, by a receiver 46 and a set-top box 48. The receiver decodes the received satellite signals while the set-top box selects the appropriate television signal within the received signal that the user is watching currently and sends that analog television signal to a television set or receiver 50. In this manner, an analog signal provided to the head-end station 32 may be sent to a plurality of households wherein each household may select a particular television channel to view. At the head-end station 32, the operator of the satellite-based system 30 may insert content, such as advertisements, into the satellite signal.

However, this content is the same for all of the households that receive the satellite signal, which is typically the entire country. To better understand a satellite-based transmission system, the format of the data from the satellite will now be briefly described.

Figure 2:
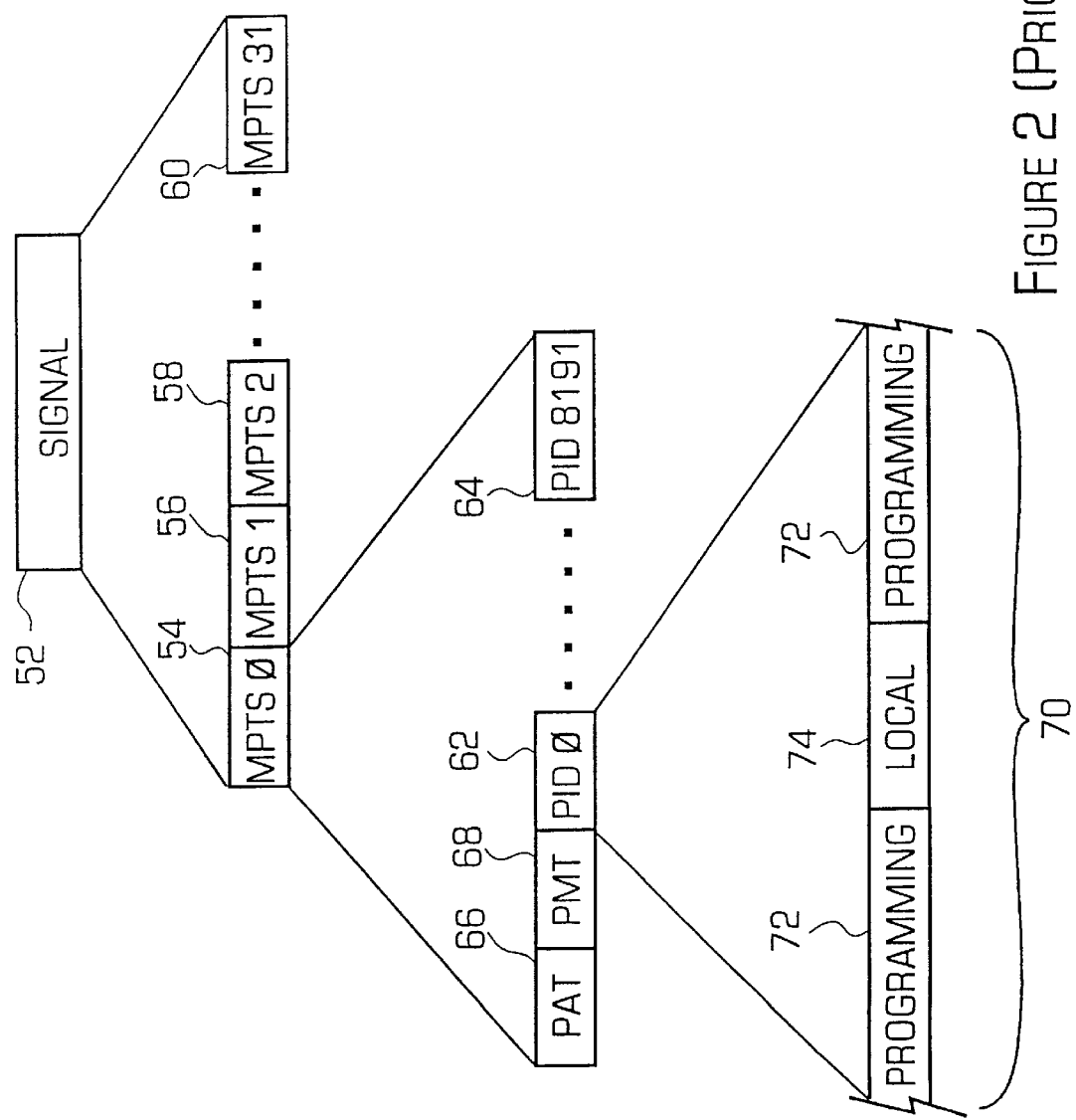
FIG. 2 is a block diagram illustrating a conventional satellite data stream.

FIG. 2 is a block diagram illustrating a conventional satellite data signal 52. The signal includes thirty-two multi-program transport streams (MPTS) 54–60, such as a first MPTS-0, a second MPTS-1, a third MPTS-2, and a last MPTS-31. Each MPTS corresponds to a separate transponder so that there are thirty-two transponders communicating data on the satellite. The receiver in each household is then tuned by the system operator to a particular MPTS so that each receiver actually receives only a single MPTS. Each MPTS includes up to eight thousand one hundred and ninety-two (8192) program identifiers (PID's) 62–64, such as a first PID-0 and a last PID-8191. A signal for a particular television channel will be broadcast on a group of PID's. The signal in each PID is compressed. Each MPTS also contains a program access table (PAT) 66 that indicates to the receiver the proper location within the MPTS for reception of the signals. The MPTS also contains a program mapping table (PMT) 68 that indicates to the receiver which of the PID's in the MPTS correspond to which of the television stations so that the set-top box may convert a request to watch a particular televisions channel into the corresponding PID. Within each PID, there is a television signal 70 that includes a data stream 72 containing the television programming data and a local content space 74. The local content space is typically a blank spot in the data stream where an operator of the satellite system may add local content into the data stream.

As described above, with a conventional satellite-based system, this local content cannot be changed for individual users of the satellite-based system. The system in accordance with the invention, however, provides for the individualization of the local content inserted into a television data stream for a particular area or even a particular viewer, as described below. In addition, the system in accordance with the invention also permits local content to be inserted within a compressed digital video stream. Now, a satellite-based system in accordance with the invention will be described.

FIG. 3 is a block diagram illustrating a satellite-based television broadcast system 100 in accordance with the invention. The satellite-based system 100 may include an uplink facility 102 and one or more satellites 104. At the uplink facility 102, a plurality of digital live feed television signals 106 are compressed and combined with a compressed digital local content signal 108 into a combined digital signal that is transmitted by an uplink antenna 110 to the satellite 104. The compressed digital local content may be transmitted back to a plurality of households using several different techniques as described below. The details of the uplink facility 102 will be described in more detail below with reference to FIG. 4. As with the conventional satellite-based system, the satellite distributes the signal from the uplink facility 102 to a plurality of households 110, such as a first household 112 and a Nth household 114, using a download antenna 115. However, as will be explained, not every household necessarily stores the same "local" content.

A receiver 116 of the satellite signal in one household, e.g., the Nth, will be described, but the receiver in each household is similar. The receiver 116 includes a receiving antenna 118 and a set-top box 120. The antenna receives the satellite signal which is digital and the set-top box processes the digital signal in order to display a selected channel on a television receiver 122. In accordance with the invention, the set-top box, as described below with reference to FIGS. 6–7, may store a portion of the transmitted digital local content data from the satellite and then selectively, based on preselected criteria, such as user preferences, insert the local content into the compressed digital data stream as described below. The set-top box may actually store only the local content transmitted by the satellite which satisfies certain preselected user preferences, and only the local content that satisfies the preferences is inserted into the compressed digital data stream so that the local content viewed by each household is individualized. For example, a user may be looking to buy a new car, and may select the preferences that are set so that the set-top box for the user stores only local content (i.e., advertisements) about automobiles. Then, when a local content space within the compressed digital data stream is identified, an automobile advertisement is shown to the user. Now, the uplink facility 102 in accordance with the invention will be described in more detail.

FIG. 4 is a block diagram illustrating the uplink facility 102 (i.e., a head-end assembly) of the satellite-based television broadcast system in accordance with the invention. For reference, the satellite 104 and the set-top box 120 are also shown, but will not be described. As shown, the live television programming data feeds 106 and the local content feeds 108 are multiplexed by a multiplexer (MUX) 140 into a compressed digital data stream having a format of an MPTS. In this example, the multiplexed data stream is shown as MPTS-0, but may also be any other of the MPTS's. All of the MPTS's are then combined together using a combiner 142 and sent to a transmitter 144. The transmitter then uses the uplink antenna 110 to transmit the digital signal output from the combiner to the satellite 104 as is described.

To generate a custom local content compressed data stream, as described above, the uplink facility 102 may include a database 146 that stores the local content. The local content database may store a plurality of pieces of local content such as a plurality of advertisements. Each piece of local content may also include the content profile as described below, a unique content identified code, a total time of the piece of local content, use statistics about the piece of local content, and utilization directives, such as an insert channel list, a view interval, a time of day the local content may be viewed, an expiration date of the local content or a maximum number of times a piece of local content may be viewed. The local content in the database 146 may be received from advertisers who wish to have the satellite operator include their local content (i.e., advertisements) in the television signal being transmitted by the satellite. To determine which local content is going to be combined with the live programming data feeds 106, the uplink facility may include a scheduler 148, an agent 150, and a statistical collector system 152. The scheduler may determine which local content is going to the combined by the combiner 140 with the live feeds based on a variety of information. For example, data about the local content being watched at a particular household 114 may be periodically communicated to the collect and decimate system 152 in the uplink facility over a communications link 154, such as a telephone line. The data from the household may include viewing time information as well as the actual television programs being viewed. The statistical collector system may collect all of the data from every household that uses the satellite-based system and then generates statistics about the data, such as the number of users that have viewed a particular advertisement or the number of users that viewed a particular type of advertisement. The statistics generated are fed into the agent 150. The agent 150, based on the statistics, may output the statistics or use the statistics to entice new advertisers to provide local content. The results of the agent may also be sold to outside companies, such as an advertisement agency. The agent may also be programmed to select particular local content based on the statistics. Based on the various information, the scheduler then determines the local content that is going to be transmitted by the satellite.

The scheduler may also generate control signals that control the operation of each set-top box in each household in accordance with the invention. For example, if the viewing statistics for a particular household changes based on the data gathered by the agent 150, the scheduler may generate an instruction, that is transmitted by the satellite to the set-top box in the particular household, which instructs the set-top box to store a different set of the local content that is also being transmitted to the household. The scheduler may also generate command signals for the set-top box which, for example, request the set-top box to update a local content control block, request an upload of statistics from the set-top box, indicate a new download to the set-top box, download software updates to the set-top box for the software being executed by the set-top box, or download a control strategy to the set-top box. The control signals from the scheduler, that may be known as content profiles, may contain a bitstream of coefficients that indicate, for example, the interest of the household 114 for each particular type of local content being downloaded to the household based on the household data received by the agent 150 as described above or any other data that may be used to target the local content. Thus, each piece of local content downloaded to the set-top box may have an associated content profile. The content profile may also include a distribution variable which determines which users of the system may be downloaded so that while local content targeted for a particular household will be received by each set-top box, it will only be stored by the set-top box in the one or more households targeted. The distribution variable may have a value, for example, indicating that all households should store the local content (i.e., "ALL"), that only households in a particular geographic region of the United States should store the particular local content (i.e., only households in the western portion of the United States), that only a particular area within a geographic region should store the particular content (i.e., only households in a particular zip code), that only households in a particular local portion of an area should store the particular content (i.e., only households in Palo Alto, Calif.) or that only a particular user should store the particular content (i.e., a particular subscriber only).

Thus, the set-top box may use these coefficients to determine which pieces of local content are going to be stored by each particular set-top box and which stored pieces of local content are going to be inserted into a live feed signal by a particular set-top box. In accordance with the invention, the pieces of local content downloaded to the set-top box may have a plurality of different content profiles and only the pieces of local content with content profiles that match some predetermined criteria stored in the set-top box are stored in the set-top box. Then, the local content space in the programming data may include control data which indicates which type of local content may be inserted in that particular local content space. The set-top box then uses the control data in the local content space to determine which piece of stored local content data is inserted into the programming data stream.

Thus, in addition to the conventional live feeds and local content, the combiner may combine a plurality of user-specific information in the satellite signal including a private data identification code that permits the set-top box in accordance with the invention to locate the private data being transmitted through the satellite in accordance with the invention. The private data may include the compressed local content, as described above, which may be transmitted to each set-top box using several different transmission strategies, as described below. This local content may not be transmitted in real-time in that the local content is not immediately viewed by the user of the set-top box since the set-top box inserts the local content into the satellite signals as needed. As described above, the private data may also include command and control data that instructs the processor within the set-top box how to insert the local content into the satellite data streams.

To download both the live feeds and local content, existing digital video broadcast systems provide a way to open a private data channel with the set-top box which can co-exist with the MPTS's. In particular, the system announces the transmission of the PAT and then insert the necessary information into the PMT as programs of some type so that the up-link facility may communicate with the set-top box on the given MPTS. Since the MPTS that a user is watching may change the control information for the system in accordance with the invention may be transmitted on all MPTS's or the set-top will have information provided to it that indicates where the control information is located. Thus, a forward channel for communicating information from the up-link facility to each of the set-top boxes is provided. Now, the multiplexing of the live feeds, the local content and the control signal will be described.

Figure 5:
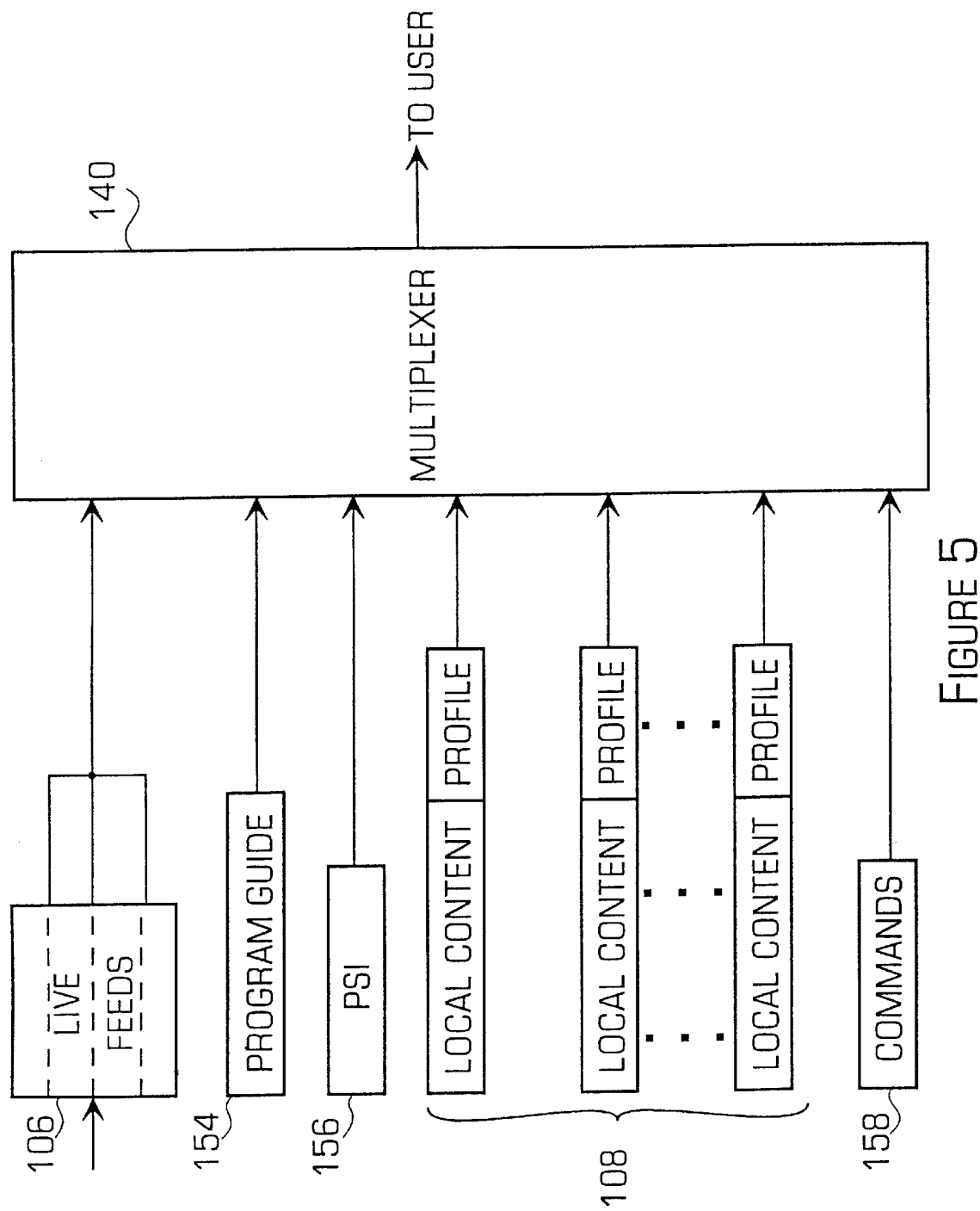
FIG. 5 is a block diagram of the live feeds, local content and commands being multiplexed together in accordance with the invention.

FIG. 5 is a block diagram illustrating the live feeds 106, the local content streams 108 and various other signals being multiplexed by the multiplexer 140 into a digital data stream that is then transmitted to the user. In addition to the conventional live feeds 106, a program guide 154 and program specific information (PSI) 156, such as the PAT and the PMT, the system in accordance with the invention also multiplexes the local content 108, and a command signal 158, as described above, into the signal. Now, the different techniques for downloading the private data over the satellite system in accordance with the invention will be described.

Figure 6:
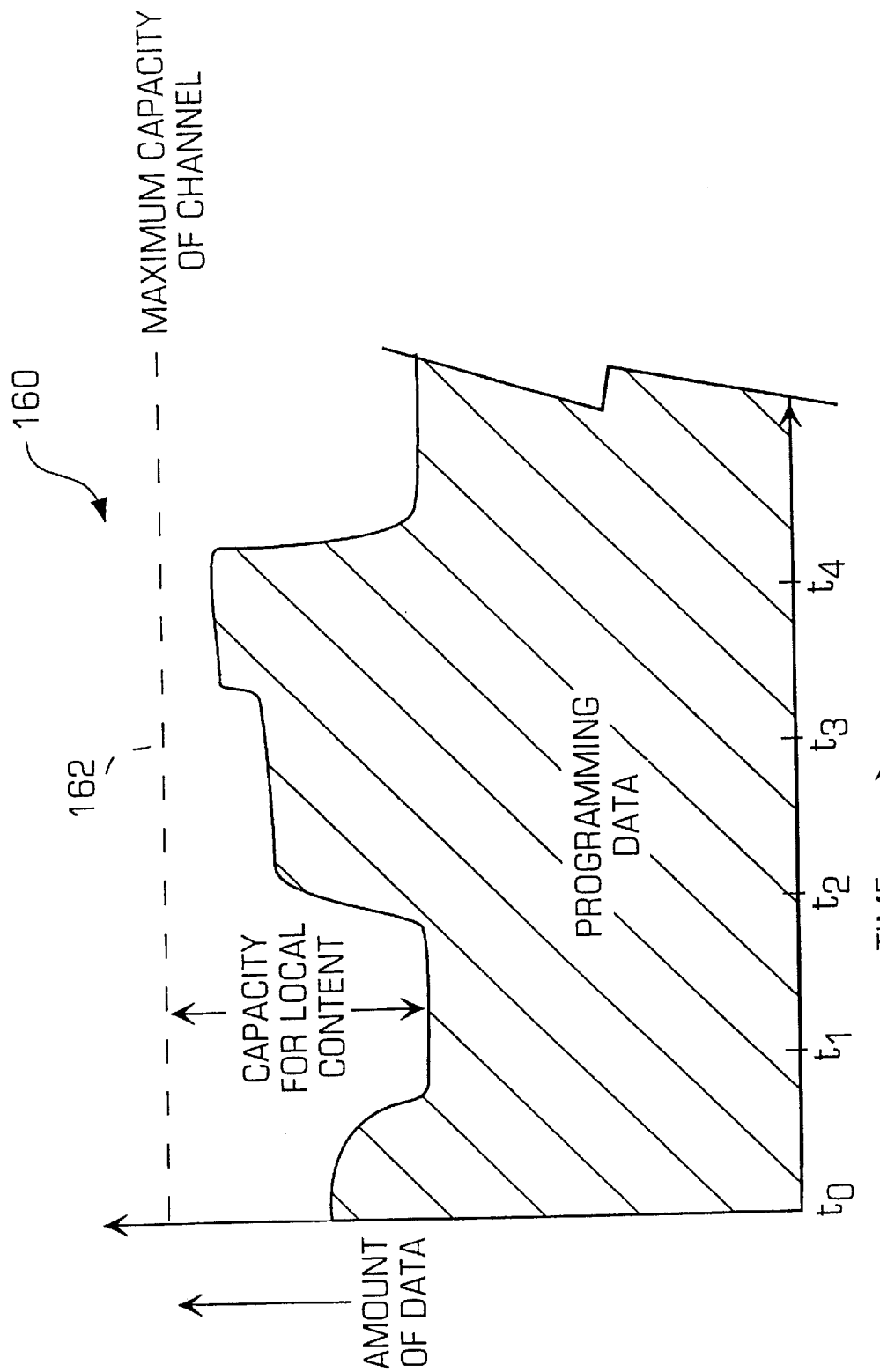
FIG. 6 is a diagram illustrating a technique for slowly downloading the local content to the set-top box in accordance with the invention.

The private data may be downloaded to each set-top box by a trickle, i.e., background, download technique, a nightly download technique or a dual receiver technique. The trickle technique takes advantage of the fact that the entire bandwidth of the satellite is not utilized at all times and the unused bandwidth may be used to download the private data and local content as shown in FIG. 6. The trickle technique may be slow since only the unused bandwidth in a particular satellite transponder is being used.

FIG. 6 is a diagram of a graph 160 showing the amount of data being transmitted over a particular satellite channel over a predetermined time interval. A maximum capacity 162 of the satellite channel is shown by the dotted line at the top of the graph. As shown, the amount of programming data being transmitted over the satellite channel changes over time. The spare bandwidth of the satellite channel not being used for programming data may be utilized to slowly download the private data, which includes the local content data, to the set-top box. Thus, between times $t_1$ and $t_2$, a larger amount of local content may be downloaded to the set-top box as opposed to the time period between times $t_3$ and $t_4$ when less local content may be downloaded to the set-top box. Thus, in accordance with this technique, as spare bandwidth over the satellite channel is available, the local content data may be downloaded to the set-top box.

The nightly download technique downloads all of the private data to the set-top box each night while the set-top box is probably not being used for viewing television. This technique may be faster than the trickle technique since the private data may use an entire channel of the satellite to download the private data. The separate receiver technique uses a set-top box in accordance with the invention that has two receivers, as described below with reference to FIG. 8 so that the private data and local content may be downloaded to the set-top box at any time over a completely separate channel from any of the normal television stations which permits on-demand local content to be downloaded. Now, the common features of these download techniques will be described.

Each of the private data downloading techniques have common features. First, for all of the techniques, the local content is downloaded before insertion or viewing by the user. Thus, the local content, in accordance with the invention, is downloaded to the set-top box in the background (i.e., un-noticed by the user) and then a particular piece of local content may be used once the entire piece of local content resides on a memory or a disk in the set-top box. For the trickle technique, the amount of time required to download all of the pieces of local content depends on how much extra bandwidth exists in the satellite signal and may occur over several days or several weeks. For the nightly download, it may require a complete night of download time in order to have sufficient local content for the next day. In accordance with one aspect of the invention, the satellite signal may include a loop of the local content located on a private MPTS so that the set-top box may retrieve the local content for the next day at any time during the night. For the dual receiver technique, on-demand local content may be provided since the local content is being provided over a separate channel.

Another common feature of the various techniques for downloading the local content and private data in accordance with the invention is the manner in which the command and control data is downloaded to the set-top box. In particular, the command and control data may be downloaded in real-time with the programming data streams (i.e., the live feeds signals) so that the set-top box may determine, based on the command and control data, where to insert the stored local content as well as what local content should be inserted into a particular spot in a particular programming data stream. This information may include the content profile data which is described above. The command and control data may also include a data structure containing data about the characteristics of a particular household which may be used by the set-top box to determine which local content is actually going to be stored by the set-top box. This user characteristics data is not downloaded in real-time and may be generated based on the data about the household that was received by the agent 150 which was described above. For example, the control data may indicate that an automobile advertisement should be inserted in a particular spot in the programming data stream and then the user characteristics data may indicate which piece of local content already stored in the set-top box will actually be inserted into the programming data stream. In accordance with the invention, from all of the local content being downloaded to the set-top box, particular pieces of local content may be filtered out and stored in the set-top box based on the command and control data. Thus, although each set-top box may receive the same downloaded local content, the pieces of local content actually stored by each set-top box for each household will be individualized to each household. Therefore, the operator of the satellite based system may individualize the local content being downloaded and stored on each set-top box in each household in accordance with the invention. Now, two embodiments of the set-top box in accordance with the invention which permits individualized local content to be viewed by each household will be described with reference to FIGS. 7 and 8.

FIG. 7 is a block diagram illustrating more details of a first embodiment of the set-top box 120 of the satellite-based television broadcast system in accordance with the invention. This first embodiment of the set-top box may be used for the trickle and nightly local content download techniques. The second embodiment of the set-top box, as described below, may be used for the on-demand download of local content. In both embodiments, the conventional receiving antenna 118 is shown for reference purposes, but will not be described. Returning to FIG. 7, the first embodiment of the set-top box 120 may include a tuner 180, a decoder 182, a transponder stream (TS) processor 184, a disk 186, a central processing unit (CPU) 188, an audio splicer 190, a video splicer 192, and a graphics generator 194. Before describing each of these portions of the set-top box in more detail, a general description of the overall operation of the set-top box in accordance with the invention will be provided.

Both embodiments of the set-top box perform the existing functions of conventional satellite set-top boxes including providing a programming guide using the graphic generator, controlling the tuning, decoding and demultiplexing of the satellite signals, generating data about the profile of the user of the set-top box, and transmitting the user profile data to the system operator at some predetermined interval. The set-top box in accordance with the invention may also control the disk in the set-top box, control the splicers, and accumulate viewer preference data in additional to the conventional user profile data. When controlling the disk, the set-top box may control the pieces of local content that are stored on the disk based on the control data, control the pieces of local content that are actually inserted into a programming data stream, and manage the real-time performance of the disk, including determining which local content may be overwritten or removed. The set-top box in accordance with the invention also performs other disk control operations, such as ensuring that the data stored on the disk is not fragmented. When controlling the splicer, the set-top box may determine the appropriate piece of local content to be inserted into the live feed based on the size of the space in the programming data stream and control the reformatting of the compressed digital data streams by the splicer in order to correctly insert the local content. In accumulating additional user preference data, the set-top box may accumulate data about when the user saw which programs and how many times the user watched a particular program. The set-top box may also continually compare these user preferences to the local content actually stored on the disk and change the local content stored on the disk in response to the user preference data. Now, the details of each portion of the set-top box in accordance with the invention will be described.

A signal from the satellite is received by the set-top box 120 by a receiving antenna 118. The signal from the antenna is fed into the tuner 180 which is tuned to a particular frequency carrying the MPTS which contains the compressed digital data stream of interest to the user of the set-top box. The tuner may be tuned to a plurality of different frequencies depending on which of the many transponders on the satellite contains the programming data streams that the user wants to watch. The selected MPTS signal is in a digital compressed format and is fed into the decoder 182 which decodes the digital compressed signal and removes any interleaving, any Reed Solomon encoding or any Virterbi encoding which was used as forward error correction to correct errors. The decoder also attempts to correct any errors in the digital compressed data streams based on the forward error correlation, as is well known. The output of the decoder is a single MPTS data stream that is fed into the transponder stream (TS) processor 184. In accordance with the invention, any private data, including pieces of local content or control data, may be extracted from the MPTS and routed to the disk 186. The disk 186 may be a conventional hard disk, but may also be composed of any type of bulk memory device. Based on the control signals, the pieces of local content may or may not be stored on the disk as described above. Any pieces of local content not stored on the disk are discarded. The storage of the pieces of local content on the disk are controlled by the CPU 188. The TS processor 184 splits the MPTS signal into a compressed digital audio stream and a compressed digital video stream which are fed into the audio splicer 190 and the video splicer 192, respectively.

Each splicer inserts selected pieces of local content into the video and audio data streams in accordance with the invention. The splicers are controlled by the CPU 188. To splice the pieces of local content into the digital compressed data stream, some conventional reformatting of the compressed signals is required. For example, for a Motion Pictures Experts Group (MPEG) compressed data stream, the image frame immediately before and after the insertion point must be reformatted into an intracoded (I) frame because an I frame, as set forth in the MPEG standard, has all of the data about the frame contained within it, as opposed to a predictive (P) frame that requires information from frames preceding it in the data stream to actually recreate the image in the frame. The splicer may also maintain the buffer flows, as described below. In accordance with the invention, the splicer which inserts the local content may also be contained in the MPTS processor so that the output of the MPTS processor may simply be demultiplexed into the audio and video data streams.

Thus, if the frames immediately before and after the insertion point are replaced with I frames as necessary, then the insertion does not destroy the predictive compression. More information about the conventional insertion of a data stream within a compressed MPEG data stream is provided in several articles including: Meng et al., "Buffer Control Techniques for Compressed-Domain Video Editing", Proceedings of IEEE International Symposium on Circuits and Systems, in Atlanta, Ga., May 1996; Wee et al., "Splicing MPEG Video Stream in the Compressed Domain", Proceedings of IEEE Signal Processing Society 1997 Workshop on Multimedia Signal Processing, in Princeton, N.J., Jun. 23–25, 1997; Wang, Bibliography of Selected Publications by the Image and Advanced Television Lab at Columbia University, Aug. 26, 1997; Meng et al., "Tools for Compressed-Domain Video Indexing and Editing", IS&T/SPIE Symposium of Electronic Imaging: Science and Technology—Storage & Retrieval for Image and Video Databases IV, San Jose, Calif., February 1996; and Meng et al., "CVEPS—A Compressed Video Editing and Parsing System", Proceedings of the ACM Multimedia 96 Conference, Boston, Mass., November 1996 all of which are incorporated herein by reference.

Once the compressed programming data stream and the local content data stream have been reformatted, the splicer may insert the selected piece of local content into the compressed digital data stream so that compressed digital audio and video streams, including the inserted local content, are generated by the splicers are output to the television so that they may be viewed by the user. In addition to these compressed digital data streams, the set-top box also generates graphical data with the graphics generator 194 under control of the CPU 188. For example, the graphics generate may generate a program guide based on data within the compressed digital data stream regarding the future programming data being transmitted to the set-top box.

In accordance with the invention, pieces of local content data and other private data are downloaded with the satellite signal. The local content may then be selectively stored in the disk based on the user preference data and control signals. The stored pieces of local content data stored on the disk may then be inserted into the compressed digital data stream at appropriate times. As described above, since the local content is selectively stored on the disk in accordance with the invention, a plurality of pieces of local content individualized to the user of a particular set-top box is provided so that the local content may be targeted to a particular type of user, a particular geographic area or the like. For example, a user may want to buy an automobile and thus the only pieces of local content stored on the disk and inserted into the programming viewed by the user may be automobile advertisements. Once the user has purchased his automobile, he may indicate to the system that he no longer needs to view only automobile advertisements and the system will adjust the pieces of local content stored on the disk and inserted into the programming data stream. Now, the second embodiment of the set-top box with dual receivers will be described.

Figure 8:
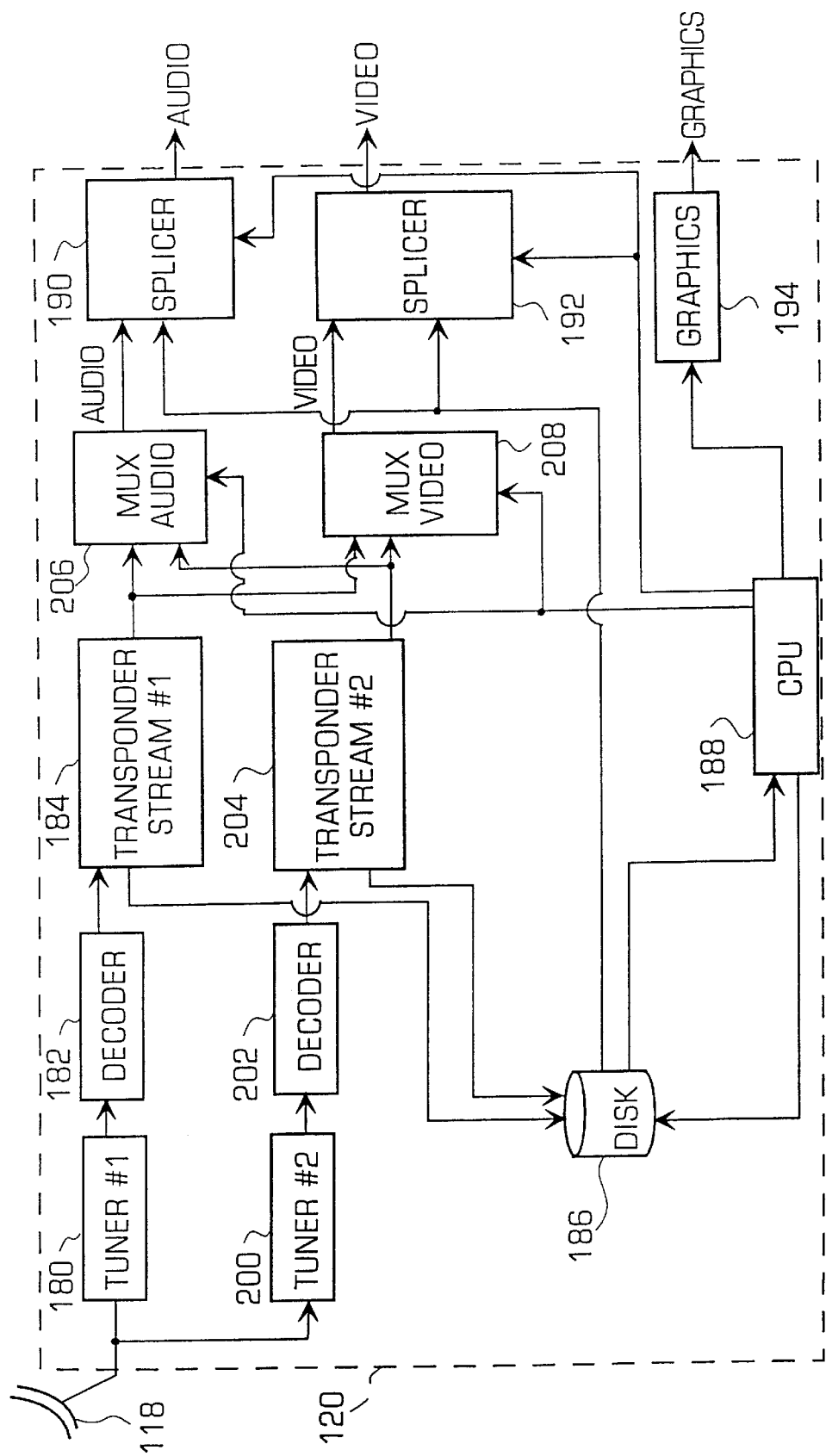
FIG. 8 is block diagram illustrating details of a second embodiment of the set-top box of the satellite-based television system in accordance with the invention.

FIG. 8 is block diagram illustrating details of a second embodiment of the set-top box 120 of the satellite-based television system in accordance with the invention. Various portions of this embodiment of the set-top box, such as the tuner 180, the decoder 182, the transponder stream processor 184, the disk 186, the central processing unit (CPU) 188, the audio splicer 190, the video splicer 192, and the graphics generator 194 are similar to the first embodiment and will not be described here. In addition to the first embodiment elements, the second embodiment of the set-top box may include a second tuner 200, a second decoder 202, a second TS processor 204, an audio multiplexer (MUX) 206 and a video multiplexer (MUX) 208. In this set-top box, the private data including the control signals and the pieces of local content are downloaded to the set-top box over a second MPTS independent of the MPTS containing the programming data stream so that on-demand local content may be provided. Thus, the private data may be received by the antenna 118 and fed into the second tuner 200 which is tuned to the MPTS having the private data. The MPTS is then decoded by the decoder 202 to remove any forward error correction, as described above, and fed into the TS processor 204. As above, the private data, including the pieces of local content from the TS processor 204, may be selectively stored in the disk 186 so that individualized pieces of local content may be inserted into the programming data stream. The two MUX's 206, 208 permit the data streams from the two MPTS's to be multiplexed together. The results of this multiplexing is a compressed digital audio signal and a compressed digital video signal. These compressed audio and video signal may then have pieces of local content inserted into the compressed data stream as described above by the splicers 190, 192.

Both of the embodiments of the set-top box also permit a user of the set-top box to browse the world wide web while viewing a television program. In particular, when the user wants to browse the web during television programming, the set-top box may spool the programming data to the disk of the set-top box while the user is browsing a web site and then play back the stored programming data once the user has completed his browsing such that the user does not miss any of the television programming during the web browsing. Now, a method for selectively storing a plurality of pieces of local content on the set-top box in accordance with the invention will be described.

Figure 9:
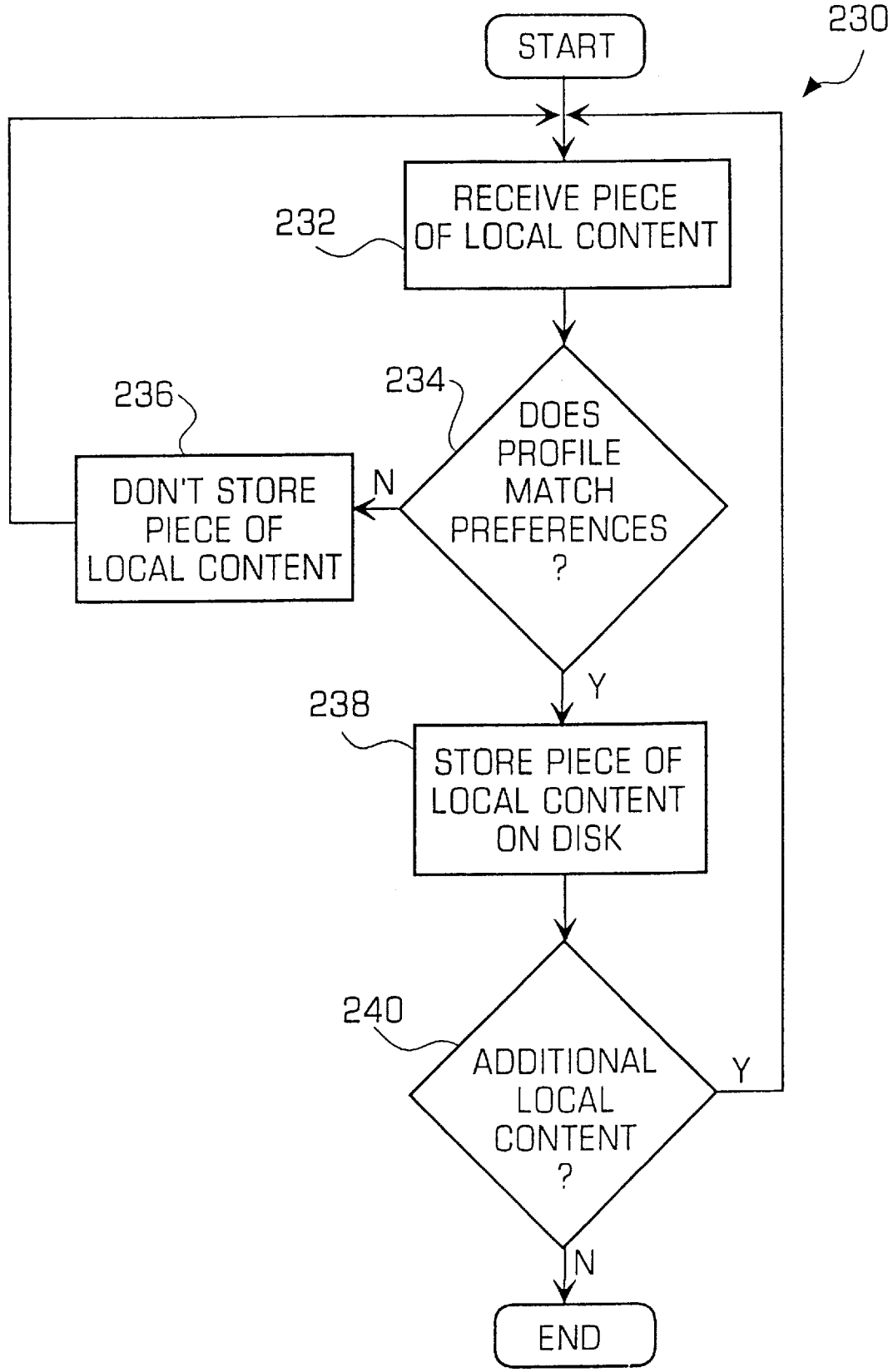
FIG. 9 is a flowchart illustrating a method for selectively storing a plurality of pieces of local content in accordance with the invention.

FIG. 9 is a flowchart illustrating a method 230 for selectively storing a plurality of pieces of local content onto the set-top box in accordance with the invention to provide individualized local content that may be inserted into the compressed digital programming data stream. At step 232, a piece of local content is received by the set-top box by one of the downloading techniques described above. The received local content may include content profile data, as described above, that is used in step 234 to determine if the content profile matches the preferences that are stored in the set-top box. For example, the set-top preferences may indicate that only sports and automobile related local content should be stored on the disk of the set-top box. Thus, using these preferences, an individualized set of pieces of local content are stored on the disk. If the content profile does not match the preferences, then the piece of local content is discarded in step 236 and the method returns to step 232. If the content profile of the local content matches the preferences, then in step 238, the piece of local content and the content profile are stored on the disk. Next, the set-top box determines if there is any more local content to be downloaded in step 240 and loops back to step 232 if there is additional local content. Otherwise, the method ends. In operation, with the trickle download technique, the selective storage method will operate in the background while the set-top box is also generating programming data. For the nightly and separate channel downloading techniques, the selective storage method operates while the downloading occurs. Now, a method for inserting individualized local content into a programming data stream will be described.

Figure 10:
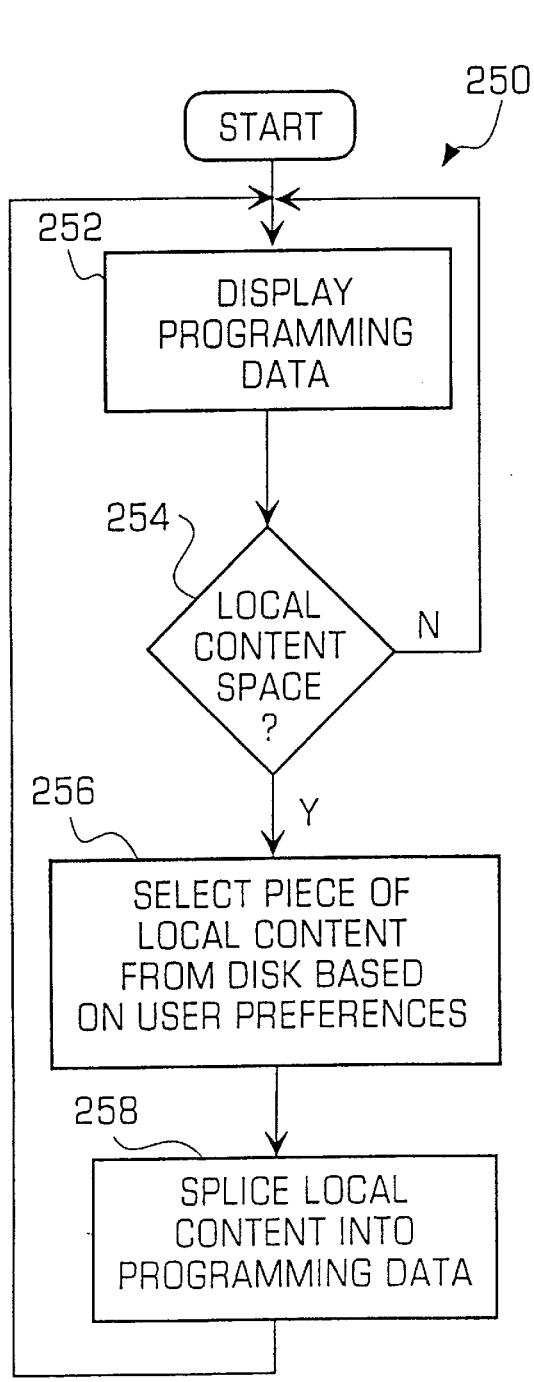
FIG. 10 is a flowchart illustrating a method for inserting individualized local content into a programming data stream in accordance with the invention.

FIG. 10 is a flowchart illustrating a method 250 for inserting individualized local content into a programming data stream in accordance with the invention. The method begins at step 252 when the set-top box is generating the audio and visual data stream to display the programming data on the television. In step 254, the set-top box determines if a local content space in the programming data has been encountered and loops back to step 252 if no local content space has been located. If a local content space has been detected, then in step 256, the set-top box determines, based on the user preferences and the content profiles of the pieces of local content stored on the disk, which piece of local content is going to be inserted into the programming data stream. Then, in step 258, the piece of local content is inserted into the programming data stream, as described above, and the method loops back to step 252. Now, a method for simultaneously browsing the world wide web while viewing the programming data in accordance with the invention will be described.

Figure 11:
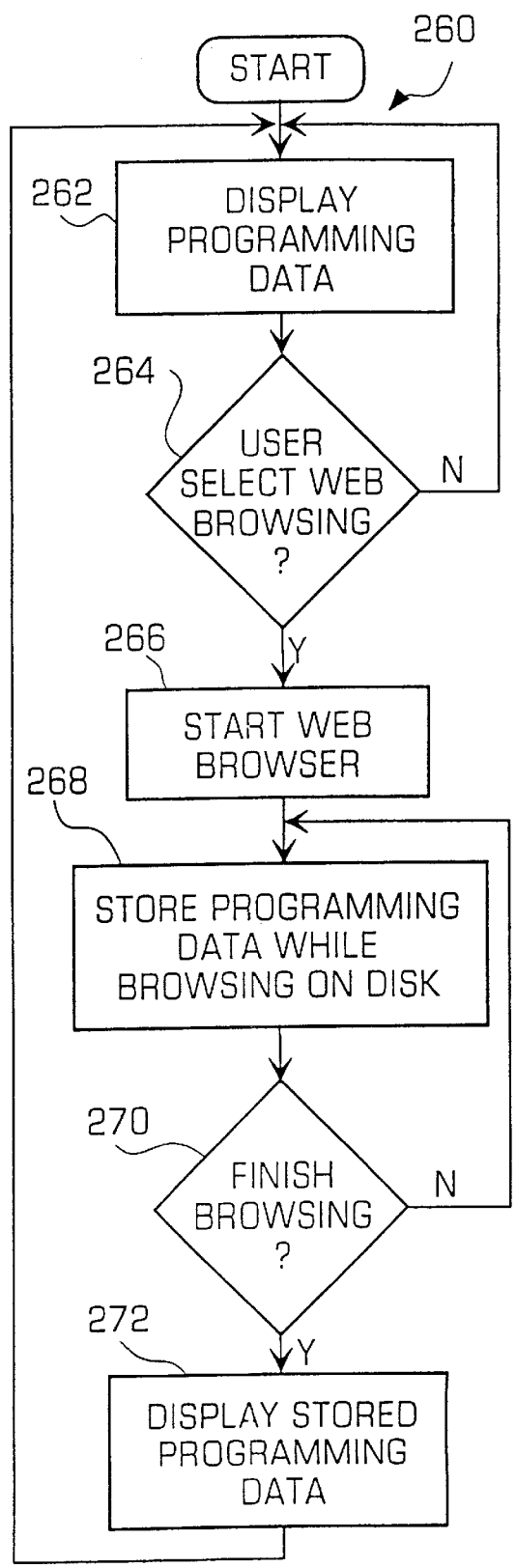
FIG. 11 is a flowchart illustrating a method for simultaneously browsing the world wide web while viewing the programming data in accordance with the invention.

FIG. 11 is a flowchart illustrating a method 260 for simultaneously browsing the world wide web while viewing programming data in accordance with the invention. In step 262, the set-top box is generating the audio and video data streams to display the programming data on the television screen of the user. Next, the set-top box determines if the user has selected to activate a web browser in step 264 when, for example, the user sees a television advertisement which references a particular web site. If the user has not activated the web browser, the method returns to step 262. If the web browser has been activated, the web browser is started in step 266. Next, in step 268, the set-top box stores the programming data that the user is missing while the user browses the web. The set-top box then determines if the user has completed the web browsing in step 270 and continues to store the programming data until the web browsing is complete. When the user has finished browsing the web, then in step 272, the set-top box may playback the programming data stored while the user was browsing the web so that the user does not miss any of the programming data content. In order to actually catch up with the programming data, the data stored on the set-top box must be played back at fast forward. Once the set-top box has played back all of the stored programming data, the method returns to step 262 and continues displaying normal programming data.

In summary, the system in accordance with the invention provides a system and method for individualizing the local content being inserted into the programming data. In particular, the local content downloaded to the set-top box may be selectively stored and then when a local content space is detected in the programming data, a piece of local content selected from the hard disk of the set-top box is inserted into the programming data. Thus, the local content displayed to a particular user is customized for that user. The system also permits the simultaneous viewing of programming data and browsing the web by spooling the programming data during the browsing to the hard disk and then playing back the stored programming data once the browsing has been completed. The system may also generate statistics about the user of the system and then sell local content space to advertisers based on these statistics.

Although the system has been described in the context of a digital satellite television broadcast system, the invention may also be used with other types of data transmission and broadcast systems to provide targeted commercials. In particular, the system may be used with a cable-based digital data broadcast system, a satellite or cable-based analog data broadcast system, a digital data broadcast system that uses a computer network, such as the Internet, a wireless cable (i.e., microwave) broadcast system, or a terrestrial broadcast system to communicate the digital data to the viewer.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. A system for communicating programming and local content data that are to be inserted into a local content space in a programming data stream at a predetermined time, the system comprising:

means for transmitting the programming and the local content data to a set-top box in a house of a user;

means, in the set-top box, for storing a predetermined portion of the local content data based on predetermined criteria;

means, in the set-top box, for identifying a local content space in the programming;

means, in the set-top box, for selecting a particular piece of local content from the storing means to insert into the local content space in the programming based on a plurality of predetermined preferences;

means for retrieving said selected piece of local content from said storage means; and means for inserting said selected piece of local content into said programming data stream at said local content space so that individualized local content specific to the user of the set-top box is inserted into the programming data stream.

2. The system of claim 1, wherein said transmitting means comprises means for transmitting the local content data in the spare bandwidth not used by the programming data.

3. The system of claim 1, wherein said transmission means comprises means for transmitting said local content data at a predetermined time.

4. The system of claim 1, wherein said set-top box further comprises a first receiver for said programming data and a second receiver for the local content data so that the local content data is transmitted simultaneously with said programming data.

5. The system of claim 1, wherein said predetermined criteria comprises user preference signals.

6. The system of claim 5, wherein said selecting means further comprises means for comparing a content profile of each piece of local content data to a control signal within the local content space of the programming data.

7. The system of claim 1 further comprising means for receiving information about the viewing of the programming data and local content data and means for processing the received information to generate data about the users.

8. The system of claim 1, wherein said transmitting means comprises a satellite.

9. The system of claim 1, wherein said transmitting means comprises a cable.

10. The system of claim 1, wherein the transmitting means comprises a terrestrial broadcast system.

11. The system of claim 1, wherein the transmitting means comprises a wireless cable broadcast system.

12. The system of claim 1, wherein said transmitting means comprises a computer network.

13. The system of claim 1, wherein said programming data and said local content are compressed digital data streams.

14. The system of claim 13, wherein said inserting means further comprises means for splicing two Motion Pictures Experts Group data streams together.

15. The system of claim 1, wherein said programming data and said local content are analog data streams.

16. The system of claim 1, wherein the predetermined preferences comprise user preferences.

17. The system of claim 1, wherein the predetermined preferences comprise preferences of an operator of the system.

18. A method for communicating programming and local content data to be inserted into a local content space in the programming data stream at a predetermined time, the method comprising:

transmitting the programming and the local content data to a set-top box in a house of a user;

storing a predetermined portion of the pieces of local content data in the set-top box based on predetermined criteria;

identifying a local content space in the programming data stream;

selecting a particular piece of local content stored in the set-top box to insert into the local content space in the programming data stream based on a plurality of predetermined preferences;

retrieving said selected piece of local content; and inserting said selected piece of local content into said programming data stream at said local content space so that individualized local content specific to the user of the set-top box is inserted into the programming data stream.

19. The method of claim 18, wherein said transmission comprises transmitting the local content data in the spare bandwidth not used by the programming data.

20. The method of claim 18, wherein said transmission comprises transmitting said local content data at a predetermined time.

21. The method of claim 18, wherein said set-top box further comprises using a first receiver for said programming data and using a second receiver for the local content data so that the local content data is transmitted simultaneously with said programming data.

22. The method of claim 18, wherein said predetermined criteria comprises user preference signals.

23. The method claim 22, wherein said selecting further comprises comparing a content profile of each piece of local content data to a control signal within the local content space of the programming data.

24. The method of claim 18 further comprising receiving information about the viewing of the programming data and local content data and processing the received information to generate data about the users.

25. The method of claim 18, wherein said transmitting means comprises using a satellite.

26. The method of claim 18, wherein said transmission comprises using a cable.

27. The method of claim 18, wherein said transmission comprises using a computer network.

28. The method of claim 18, wherein said transmission comprises using a terrestrial broadcast system.

29. The method of claim 18, wherein said transmission comprises using a wireless cable system.

30. The method of claim 18, wherein said programming data and said local content are compressed digital data streams.

31. The method of claim 30, wherein said insertion further comprises splicing two Motion Pictures Experts Group data streams together.

32. The method of claim 18, wherein said programming data and said local content are analog data streams.

33. The method of claim 18, wherein said predetermined preferences comprise user preferences.

34. The method of claim 18, wherein said predetermined preferences comprise preferences of an operator of the system.

35. An apparatus for displaying images from a programming data stream and a data stream containing pieces of local content data that are going to be inserted into a local content space in the programming data stream at some predetermined time, the apparatus comprising:

means for receiving the programming data stream and the pieces of local content data;

means for storing a predetermined portion of the received pieces of the local content data based a predetermined criteria;

means for identifying a local content space in the programming data stream;

means for selecting a particular piece of local content to insert into the local content space in the programming data stream based on a plurality of predetermined preferences of a user;

means for retrieving said selected piece of local content from said storage means; and means for inserting said selected piece of local content into said programming data stream at said local content space so that individualized local content is inserted into the programming data stream.

36. The apparatus of claim 35, wherein said receiving means comprises means for receiving the local content data in the spare bandwidth not used by the programming data.

37. The apparatus of claim 35, wherein said receiving means comprises means for receiving said local content data at a predetermined time.

38. The apparatus of claim 35 further comprises a first receiver for said programming data and a second receiver for the local content data so that the local content data is transmitted simultaneously with said programming data.

39. The apparatus of claim 35, wherein said predetermined criteria comprises user preference signals.

40. The apparatus of claim 39, wherein said selecting means further comprises means for comparing a content profile of each piece of local content data to a control signal within the local content space of the programming data.

41. The apparatus of claim 35, wherein said programming data and said local content are compressed digital data streams.

42. The apparatus of claim 41, wherein said inserting means further comprises means for splicing two Motion Pictures Experts Group data streams together.

43. The apparatus of claim 35, wherein said programming data and said local content are analog data streams.

44. A method for displaying images from a programming data stream and a data stream containing pieces of local content data that are going to be inserted into a local content space in the programming data stream at some predetermined time, the method comprising:

receiving the programming data stream and the pieces of local content data;

storing a predetermined portion of the received pieces of the local content data based a predetermined criteria;

identifying a local content space in the programming data stream;

selecting a particular piece of local content to insert into the local content space in the programming data stream based on a plurality of predetermined preferences of a user;

retrieving said selected piece of local content from said storage means; and inserting said selected piece of local content into said programming data stream at said local content space so that individualized local content is inserted into the programming data stream.

45. The method of claim 44, wherein said receiving comprises receiving the local content data in the spare bandwidth not used by the programming data.

46. The method of claim 44, wherein said receiving comprises receiving said local content data at a predetermined time.

47. The method of claim 44 further comprises using a first receiver for said programming data and using a second receiver for the local content data so that the local content data is transmitted simultaneously with said programming data.

48. The method of claim 44, wherein said predetermined criteria comprises user preference signals.

49. The method of claim 48, wherein said selecting further comprises comparing a content profile of each piece of local content data to a control signal within the local content space of the programming data.

50. The method of claim 44, wherein said programming data and said local content are compressed digital data streams.

51. The method of claim 50, wherein said inserting further comprises splicing two Motion Pictures Experts Group data streams together.

52. The method of claim 44, wherein said programming data and said local content are analog data streams.

* * * * *